Figure 1:
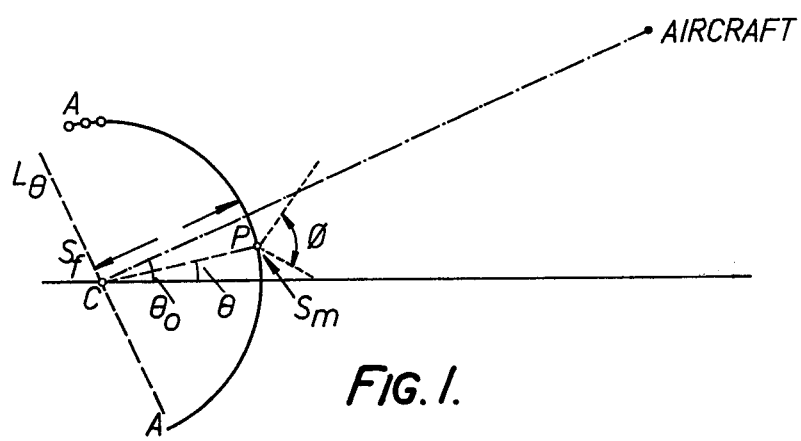

United States Patent [19]

Wild

[11] 4,017,862
[45] Apr. 12, 1977

[54] AIRCRAFT GUIDANCE SYSTEM
[75] Inventor: John Paul Wild, Strathfield, Australia
[73] Assignee: Commonwealth Scientific and Industrial Research Organization, Campbell, Australia
[22] Filed: Oct. 15, 1974
[21] Appl. No.: 514,713
[30] Foreign Application Priority Data
Oct. 15, 1973   Australia .......................... 5243/73
[52] U.S. Cl. ..................... 343/108 M; 343/100 CL; 343/106 D
[51] Int. Cl.² .......................................... G01S 1/18
[58] Field of Search ..... 343/108 M, 106 D, 100 CL
[56] References Cited
UNITED STATES PATENTS
3,670,337  6/1972  Earp et al. .................... 343/108 M
3,704,465  11/1972  Masak et al. ................. 343/108 M Primary Examiner—Malcolm F. Hubler
Assistant Examiner—Richard E. Berger
Attorney, Agent, or Firm—Sughrue, Rothwell, Mion, Zinn & Macpeak

[57] ABSTRACT

A ground installation for an aircraft landing system has an array of transmitting elements located on the arc of a circle. When the elements are activated sequentially either in one direction ("to") or the other ("fro"), a signal is transmitted which, when mixed with a reference signal, produces a wave train in the aircraft having varying beat frequency. Cross-correlating two wave trains, produced by consecutive to and fro excitations, to establish the time delay between them can be used to establish positional information for an aircraft.

5 Claims, 5 Drawing Figures

AIRCRAFT GUIDANCE SYSTEM

This invention concerns a system for generating signals-in-space which, when intercepted by an aircraft, may be used to determine the angular position of the aircraft relative to the signal generation point. In addition, the present invention concerns the decoding of signals received in a moving aircraft.

This invention has been proposed for use in conjunction with other signals-in-space generation systems to provide navigation aids, notably a microwave landing system, but it will be apparent to those skilled in this art that it is not limited to aircraft landing systems. For convenience, however, the present invention will be described in this specification in the form in which it may be used as the signal generation system for providing height information to aircraft in the final stages of landing preceding actual touchdown, generally known as the flare.

According to the present invention, a ground installation for an aircraft guidance system comprises an array of transmitting elements located on the arc of a circle and arranged so that the elements, singly or severally, can be activated progressively at the same frequency, first in one direction around the arc and then in the other direction.

Such progressive activation of transmitting elements is generally referred to as to and fro sweeps of the array.

The installation may also include a reference source adapted to transmit continuously either at the same frequency or at a frequency shifted by a fixed amount.

The arc of the array of elements should subtend an angle at least equal to the angle over which the information is required plus the effective instantaneous beam-width, in the plane of the arc, of the signal from the individual elements of the array. In the case where a plurality of elements are arranged to be transmitting simultaneously (i.e., there is an overlap of transmission periods of adjacent elements as they are sequentially actuated), the angle subtended by the arc of the array of elements should be the information angle plus the effective instantaneous beam-width, in the plane of the arc, of the group of elements which are simultaneously radiating.

The reference signal transmitter may be located at the centre of the circular arc of the array, or elsewhere.

The present invention also encompasses a method of decoding signals received from a moving source ground installation of the type described above, the method comprising:

i. mixing the signals received from the ground installation array with the signal from a continuously transmitting reference source of constant frequency, thereby obtaining, for each sweep of the signal from the array, a wave train in which the beat frequency varies progressively, and ii. cross-correlating the wave trains from consecutive to and fro sweeps to establish the time delay between them.

Figure 2A:
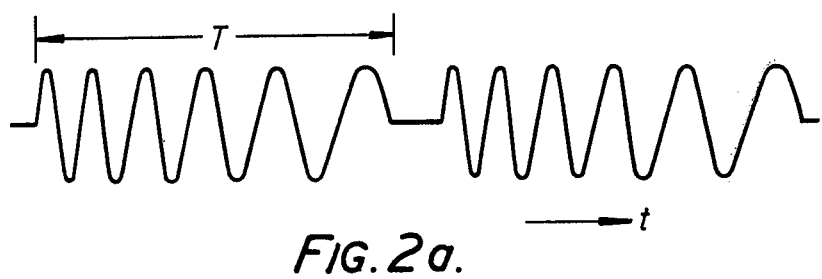
Figure 2B:
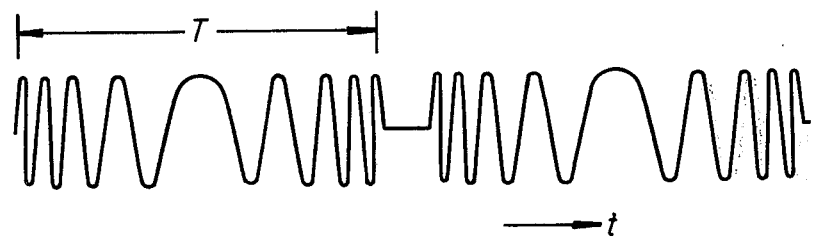
Figure 3:
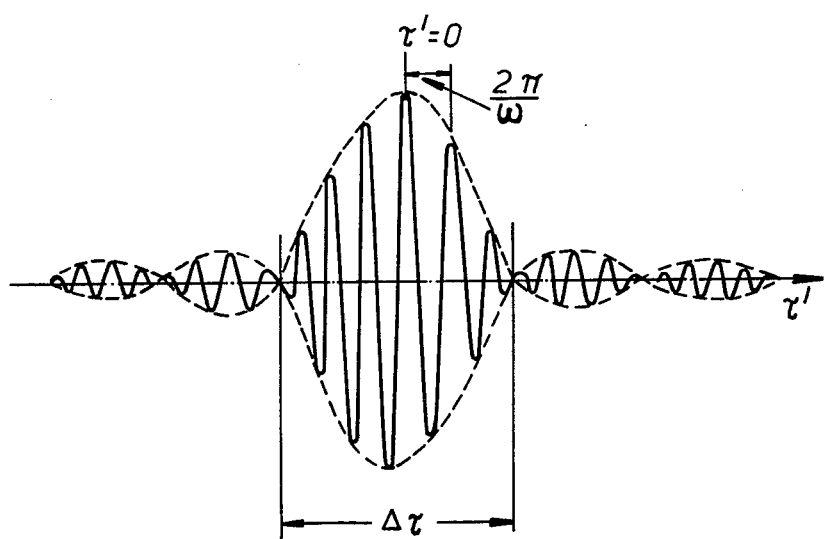
Figure 4:
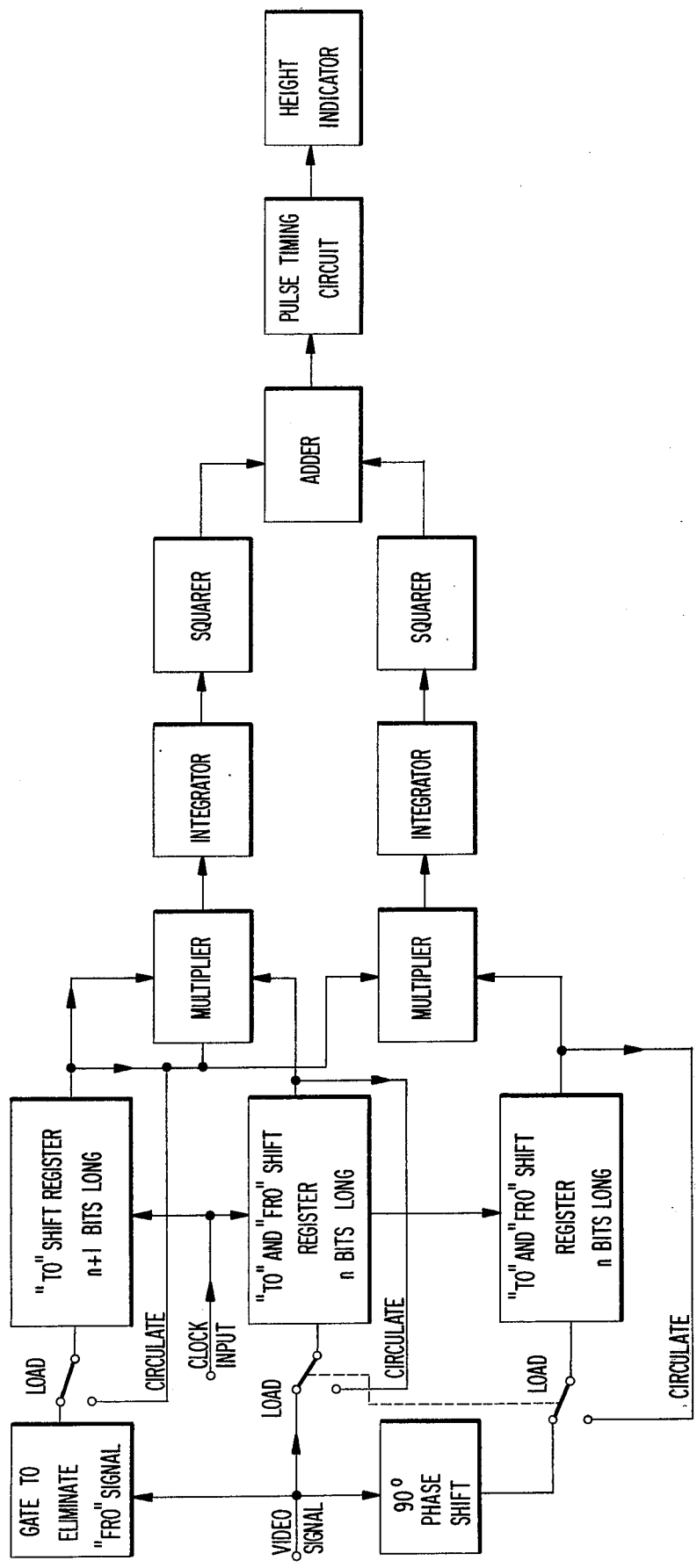

A description of a flare guidance (elevation) system incorporating the present invention and a method for decoding signals received from the system will now be given, with reference to the accompanying drawings, of which:

FIG. 1 illustrates the geometry of an array of transmitting elements,

FIG. 2a shows the signal received by an aircraft which intercepts the signal in space for the case where the reference signal is displaced below the frequency fed to the elements, FIG. 2 (b) illustrates the signal received by an aircraft which intercepts the signal in space when the reference signal and the frequency fed to the elements of the array are the same, FIG. 3 illustrates the type of correlation function generated when decoding received signals of the type shown in FIG. 2a (with those of the type shown in FIG. 2 (b) the correlation function is related to the envelope of FIG. 3), and FIG. 4 is a block diagram of a decoding arrangement which may be used to interpret signals received from an aerial having the geometrical structure depicted in FIG. 1.

It is generally known that an accurate indication of the height of an aircraft flying down the centre-line of the runway of an airport can be obtained from elevation angle data provided by scanning a horizontal planar beam to and fro about an axis parallel to and at known distance from the runway centre-line. The present invention can provide data equivalent to that given by such a scanning radio beam.

Referring to FIG. 1, an array of transmitting elements is located in a vertical plane on an arc AA of a circle of centre C. To provide information as indicated in the last preceding paragraph, the vertical plane of the array is located normal to the runway centre-line so that C is a convenient distance from it. (It should be noted that a feature of the present invention is that the distance from the runway is not critical). Each element, or group of elements, is designed to radiate, when activated, with a beam of effective width $\phi$ in this plane. For a flare guidance system, the beamwidth in the inclined plane through the radial CP can be made about ± 90°, centred on the plane of the array.

When the transmitting elements are activated sequentially (for example, with four elements transmitting at any time) the array provides a moving source $S_m$ which is caused to move up and then down around the arc AA. If elevation angles $\theta$ are required to be measured between $\theta = 0$ (i.e., the horizontal) and $\theta = \theta_{max}$, then the source should move upward from an angle of $\phi/2$ to a maximum elevation angle of $[\theta_{max} + (\phi/2)]$ and then down again.

The flare guidance system preferably also incorporates a fixed reference source $S_f$ located, in the example of FIG. 1, at the centre C of the circular arc AA. The fixed reference source need not, however, be located at this point; it may be included at any convenient location which enables an aircraft intercepting the signal from the array also to receive the signal from the fixed source. The reference source may even be located within the aircraft, provided that stringent frequency standards are maintained both on the ground and in the aircraft.

If the moving source transmits at an angular frequency $\omega_m$ and the reference source transmits continuously at an angular frequency $\omega_f$, the aircraft receiver will detect the beat frequency between the two sources, which, because one of the signal sources is effectively moving (so causing a doppler effect), will have the structure illustrated in FIG. 2a if $\omega_m > \omega_f$. If $\omega_m < \omega_f$, the low frequency beats will occur first; if $\omega_m = \omega_f$, the beat frequency will decrease to zero, then increase again as shown in FIG. 2b. It should be noted that the same signal waveform is received whether the signal from the array is received when the source is moving upwards or downwards (i.e., "to" or "fro" signals). By cross-correlating the "to" and "fro" signals, the proper time delay between them can be determined. This is then convertible into a direct measure of the elevation angle, $\theta$.

The operation of the system and its performance in the presence of interference from multi-path reflections can be demonstrated mathematically as follows:

Let the movement of $S_m$ be described by $\theta = -\Omega t$ ($t < 0$, during the downward motion)

$\theta = \Omega t$ ($t > 0$, during the upward motion)    (1)

Then referring all phases to the line $L\theta$ in FIG. 1, and putting $\omega = \omega_m - \omega_f$, the aircraft receives the beat-frequency signal $V_\pm (t)$ given by $$V_\pm(t) = \cos\left\{\omega t + \frac{2\pi r}{\lambda} \cos(\theta - \theta_o)\right\}$$

$$\cos\left\{\omega t + \frac{2\pi r}{\lambda} \cos(\theta_o \pm \Omega t)\right\}, \quad (2)$$

where the upper sign in the last term refers to the downward motion and the negative sign in this term to upward motion of the transmitted signals. The cross-correlation co-efficient, $\eta(\tau)$, is defined by $$\eta(\tau) = \frac{1}{T} \int_{-T/2}^{T/2} V_+\left(t - \frac{\tau}{2}\right) V_-\left(t + \frac{\tau}{2}\right) dt \quad (3)$$

(Note that this expression assumes a rectangular shape for the beam of instantaneous beamwidth $\phi$ and is valid only for $t \ll T$; it is nevertheless a most illuminating formulation of the problem for the present purpose.) Substituting (2) in (3), expressing the integrand of (3) in the form of cos(sum) + cos (difference), and assuming (as can easily be justified) that the cos (sum) term can be neglected, and that $$\frac{\phi}{2} = \frac{\Omega T}{2}$$

is small enough for $\sin \Omega t$ to be replaced by $\Omega t$, it can be shown that $$\eta(\tau) = \frac{\cos \omega \tau \sin\left\{\frac{2\pi r}{\lambda} \sin\left(\theta_o - \frac{\Omega \tau}{2}\right) \Omega T\right\}}{\frac{2\pi r}{\lambda} \sin\left(\theta_o - \frac{\Omega \tau}{2}\right) \Omega T}$$

If $\tau' = \tau - \frac{2\theta_o}{\Omega}$, then for small $\tau'$, $$\eta(\tau') = \cos\left(\omega \tau' + \frac{2\theta_o}{\Omega}\omega\right) \cdot \left[\frac{\sin\left(\frac{\pi r \Omega^2 T \tau'}{\lambda}\right)}{\frac{\pi r \Omega^2 T \tau'}{\lambda}}\right]$$

This function is sketched in FIG. 3. It should be noted that the phase of the internal modulation varies within the envelope with $\theta_o$, the angle of elevation. The correlation time-width $\Delta \tau$ is such that $$\Delta \theta \equiv \frac{\Omega \Delta \tau}{2} = \frac{\lambda}{r(\Omega T)} \approx \frac{\lambda}{2r \sin \phi/2},$$

which is the angular beam-width determined by the effective linear aperture of the aerial. The system therefore has the same performance in the pesence of multipath reflections as a scanning beam system having such a linear aperture.

As an example, if the feed elements of the array are spaced apart $0.7\lambda$ ($\lambda$ being the wavelength of the transmitted signal), and the beam width $\phi$ is about 60°, the effective aperture of the array is equal to the radius $r$ of the circle on which the arc of elements is located. If the radius of the circle is 100 $\lambda$, the arc length for a 30° elevation coverage is 157$\lambda$, which at a wavelength of 5.8 cm means the array has a height of 7.95m.

In practive, the minimum elevation will be a small negative angle (not horizontal).

A suitable delay or identifiable signal after each "to-fro-38 sweep is required to ensure that the aircraft equipment can correctly identify each "to" and "fro" signal (and not become confused by a "fro" and "to" signal spacing of the same magnitude).

Reference to FIG. 1 shows that the above calculation refers only to an aircraft lying in that plane of the array of the aerial. For any other position, $r$ in equation (2) and elsewhere must be replaced by $r \cdot \cos$ (azimuth), where azimuth is measured in the tilted plane containing the aircraft and the aerial's axis of symmetry. Hence the width $\Delta t$ of the envelope pattern in FIG. 3 varies with azimuth.

A preferred method of decoding the angle information in the aircraft is to use a circuit which the two signal waveforms received as a result of beating the to and the fro sweeps with the reference signal are read sequentially into a serial storage system as a video signal and a single high-speed correlator then auto-correlates the first signal and cross-correlates the first and second signals. The time interval between the auto-correlation and the cross-correlation in each scan cycle is a measurement of the desired angle $\Theta_o$.

An embodiment of the above method is illustrated in FIG. 4, where the serial storage devices are digital shift registers. Here two correlators, operating in phase quadrature, are employed to accommodate radio frequency phase variations between the to and the fro signals.

In the simplest arrangement, the signal is hard limited so that 1-bit sampling may be used. In a system providing height information to aircraft, studies have shown that it is desirable for the signal to be quantized in several amplitude steps (multi-bit digitization) spurious reponses caused by ground reflections.

Alternatively a circuit may be used which correlates the received waveform $V(t)$ with a delayed replica $V(t - \tau)$ of the same waveform, the delay having many ($n$) equally spaced values $\tau_1, \tau_2, \tau_3, \ldots, \tau_n$; with this system $n$ correlators are required, giving $n$ simultaneous correlations. The value of $\tau$ (interpolated as necessary) which gives the maximum correlation is used to calculate the desired angle $\theta_o$.

The 'side-lobes' of the correlation function (FIG. 3) may be reduced as desired both i. on the ground, by suitably shaping the simultaneous primary beam of beam-width $\phi$, and ii. in the air, by shaping the frequency response of the filter with which the waveform shown in FIG. 3 is received.

The correlating process may be done by digitising and compressing both signals in time and circulating them in shift registers which advance one signal with respect to the other by one bit per circulation until all desired positions have been tested. To cancel time delays due to subsequent processing the first signal is arranged to auto-correlate producing an outward pulse and then the first and second signals are cross-correlated producing a second output pulse. The measurement of the time interval between the signals is thus reduced to the measurement of the time interval between the two pulses. The digitising and shift register clock frequencies are so chosen that real time operation results.

The claims defining the invention are as follows:

1. A method of decoding signals received from a moving source ground installation, for an aircraft guidance system of the type comprising an array of transmitting elements located on the arc of a circle, said elements being activated progressively at the same radio frequency, first in one direction around the arc and then in the other direction said method comprising:

i. mixing the signals received from the array of transmitting elements with the signal from a continuously transmitting reference source of constant frequency, thereby obtaining, for each sweep of the signal from the array, a wave train in which the beat frequency varies progressively, and ii. cross-correlating the wave trains thus obtained from consecutive to and fro sweeps of the signal from the array to establish the time delay between them.

2. A method as claimed in claim 1 wherein said cross-correlating is effected by storing the received signals and auto-correlating the first signal with itself and then cross-correlating the first signal with the second signal to establish the time interval between them.

3. A method as claimed in claim 1 wherein said cross-correlating is effected by performing a number of simultaneous correlations on the signals in parallel correlators to establish the time interval between the signals.

4. A method as claimed in claim 2 wherein, in performing said cross-correlating, the signals are hard limited and digitized by 1-bit sampling 5. A method as claimed in claim 2 wherein, in performing said cross-correlating, the signals are quantized in several amplitude steps (multi-bit digitization) to minimize the effect of ground reflections.

* * * * *